Aug. 2, 1955  S. M. MacNEILLE  2,714,677
COMPENSATED ION CHAMBER
Filed March 31, 1950  2 Sheets-Sheet 2
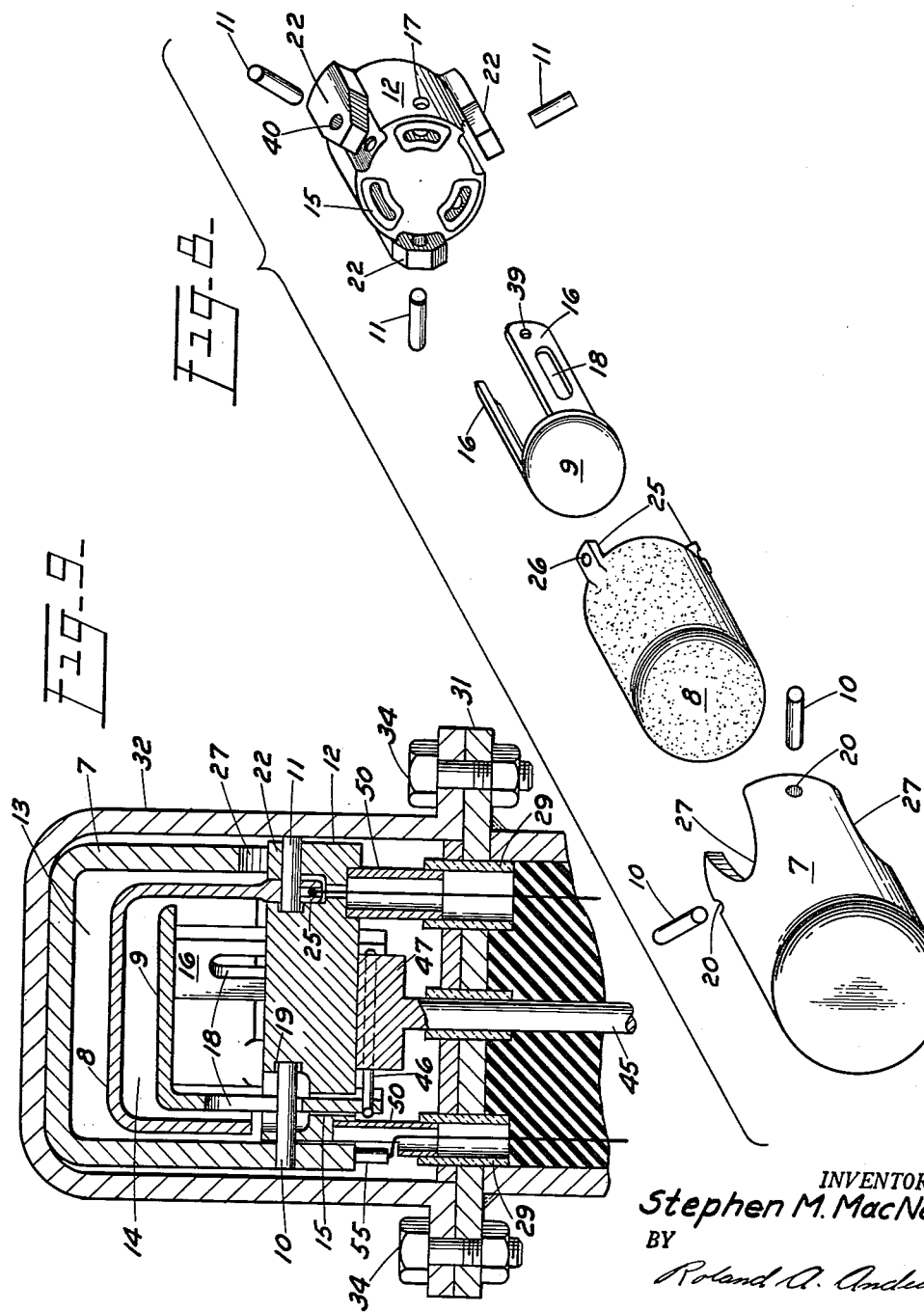
INVENTOR.
Stephen M. MacNeille
BY
Roland A. Anderson
ATTORNEY United States Patent Office 2,714,677
Patented Aug. 2, 1955

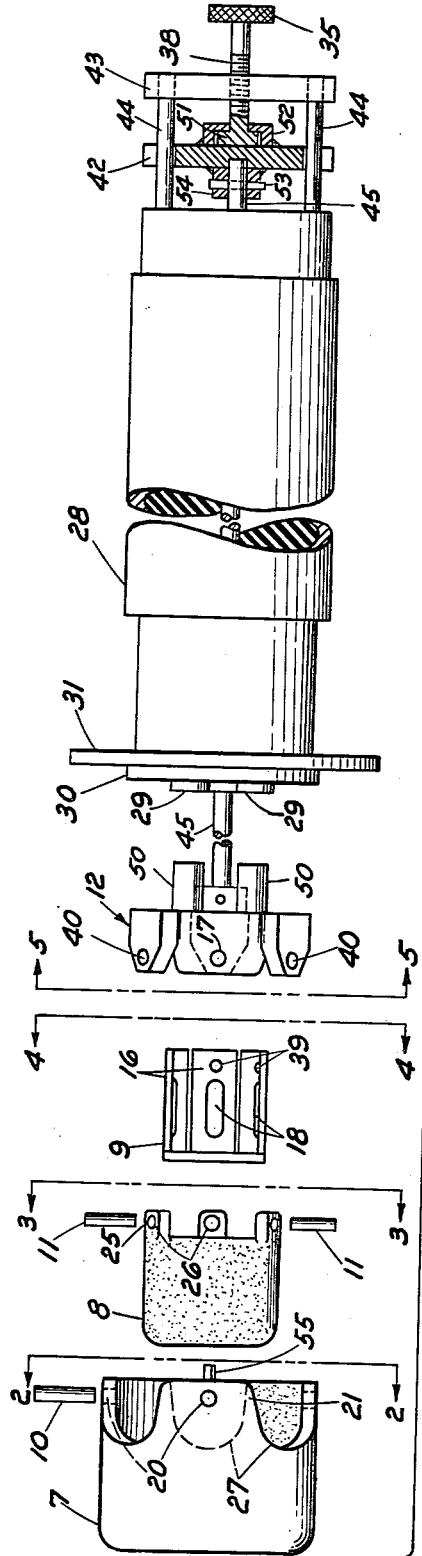

2,714,677
COMPENSATED ION CHAMBER
Stephen M. MacNeille, Fairport, N. Y., assignor to the United States of America as represented by the United States Atomic Energy Commission Application March 31, 1950, Serial No. 153,249

8 Claims. (Cl. 313—61)

My invention relates to radiation detectors, and more particularly to ionization chambers having a high degree of sensitivity and which are especially useful in measuring the neutron density in high flux piles or reactors.

This invention is an improvement over the ionization chamber disclosed in the prior co-pending application of Mead et al., Serial Number 127,416, now Patent No. 2,604,598.

In the prior art of neutron detection it has been the practice to coat electrodes with some neutron sensitive or active metal such as boron or lithium. Incident neutron radiation would cause the boron or lithium nucleus to absorb a neutron and to emit an alpha particle, which, in turn, could be employed to ionize the gas molecules of a gas ionization chamber. The resulting ion current was collected and the intensity served as a measure of the neutron flux to which the chamber was exposed. See Brons 2,220,509, and Kallmann et al., 2,288,718.

However, the usefulness of the devices of the prior art were limited by the range of power levels over which these devices would operate. This is known as the effective range and has also been defined as the ratio of the maximum ionization current at the saturation potential to the current produced by the beta or gamma activity within the chamber 30 minutes after its removal from exposure to the flux. In short, the effective range over which the chamber would give accurate results was generally limited by the background current due to radioactivity induced in the chamber itself, and to the sensitivity of the electrodes thereof.

The background currents were contributed to or controlled by the induced activity in the materials of the ionization chamber, and the exposure of the electrode mounting insulators to radiation, while the sensitivity was affected by the quality of the coating on the electrodes. Other factors, such as degree of saturation, leakage and ruggedness affected the performance or usefulness of the device.

Applicant with a knowledge of all of these problems in the prior art has for an object of his invention the provision of a neutron sensitive ionization chamber which has an increased range and improved sensitivity.

Applicant has as another object of his invention the provision of an ionization chamber for measuring neutron flux employing materials which has a minimum neutron induced radioactivity.

Applicant has as another object of his invention the provision of an ionization chamber for measuring neutron flux having electrodes with improved neutron sensitive coatings thereon.

Applicant has as another object of his invention the provision of an ionization chamber for measuring neutron flux which has a high degree of saturation.

Applicant has as another object of his invention the provision of an ionization chamber for measuring neutron flux which has a low leakage.

Applicant has as a further object of his invention the provision of an ionization chamber for measuring neutron flux which is rugged and which will withstand the heat, shock, strains and other effects to which it may be subjected.

Applicant has as a further object of his invention the provision of an ionization chamber for measuring neutron flux which positions the insulating and supporting structure at locations removed from the sensitive volume of the chamber to minimize radiation incident to them.

Applicant has as a still further object of his invention the provision of an ionization chamber for measuring neutron flux of a source which employs shielded insulators to prevent alpha and beta rays therefrom from entering the chamber and to minimize electrostatic fields at insulator surfaces.

Applicant has as a still further object of his invention the provision of an ionization chamber for measuring neutron flux which may be accurately compensated.

Applicant has as a still further object of his invention the provision of an ionization chamber for measuring neutron flux having electrodes which provide greater surface area of neutron sensitive coating for exposure to neutron flux.

Other objects and advantages of my invention will appear from the following specification and accompanying drawings and the novel features thereof will be particularly pointed out in the annexed claims.

In the drawings, Fig. 1 is an exploded elevation of the elements of my improved ionization chamber in disassembled position.

Fig. 2 is an elevation view of my improved ionization chamber taken along line 2—2 of Fig. 1.

Fig. 3 is an elevation view of the intermediate electrode of my improved ionization chamber taken along line 3—3 of Fig. 1.

Fig. 4 is an elevation view of the inner electrode of my improved ionization chamber taken along line 4—4 of Fig. 1.

Fig. 5 is an elevation view of the retaining ring of my improved ionization chamber taken along line 5—5 of Fig. 1.

Fig. 6 is an elevation view of the upper portion of my improved ionization chamber showing the protective cap or cover.

Fig. 7 is a schematic diagram of the compensation circuit of my improved ionization chamber.

Fig. 8 is an oblique exploded view of the parts of my improved ionization chamber.

Fig. 9 is a cross sectional view of my improved ionization chamber taken along the line 9—9 of Fig. 6.

Among the commonly available materials, graphite and lead combine the smallest neutron absorption cross sections with comparative freedom from radiation damage. Actually, graphite activates somewhat less than lead, and since it was found to be more easily purified and had better dimensional stability than lead, it was decided to make the electrodes and other parts surrounding the collecting volume of graphite alone. Lead has been used only where it is shielded from the collecting volume by graphite. Magnesium, a substance found to be less subject to activation among those having strength, machineability, lightness and availability, is used only in places where it is shielded even from the graphite by lead.

Since the ionization chamber essentially measures alpha radiation, there is no great advantage in using a pressure different from atmospheric and the chamber was operated at atmospheric pressure. For optimum saturation characteristics the electrode separation should be made as small as possible but for maximum sensitivity separation should be at least equal to the alpha particle range, although the sensitivity at first falls off very slowly as the electrode spacing becomes less than the alpha particle range. A spacing of one-fourth inch has been chosen since this is about as small as convenient and yet is 90% of the 7 mm. alpha particle range. At this spacing less than 1% of the potentially available current is lost.

Since the chamber will evidently be somewhat sensitive to gamma rays, it is necessary, in order to reduce background current, to provide a similar neutron insensitive ionization volume, the current from which would be used to balance out the portions of the chamber current due to gamma rays. This compensation was made precise by the provision for adjustment of the relative volumes of the two ionization regions.

Referring to the drawings in detail, and particularly to Figs. 1 to 5, inclusive, the ionization chamber is comprised of an inner electrode 9, an outer electrode 7, and an intermediate electrode 8. These electrodes are maintained in spaced assembled relation by two sets of quartz rod insulators 10 and 11 to define a pair of mating ionizing chambers. The upper chamber is defined by the outer electrode 7 and the intermediate electrode 8, and may be referred to as the neutron sensitive ionizing chamber, designated generally 13, while the lower chamber is defined by the inner electrode 9 and the intermediate electrode 8, and may be referred to as the neutron insensitive or compensating ionizing chamber, generally designated 14. In their preferred form the outer cup electrode 7 and the intermediate electrode 8 are about one-eighth inch thick and spaced about one-quarter inch apart. These two cup shaped electrodes were formed to provide greater surface area for the metal film or coating, preferably of boron-10, which is provided on the walls of the outer chamber 13, that is, on the inner walls of cup shaped electrode 7 and the outer walls of cup shaped electrode 8. By exposing more of this neutron sensitive coating per unit volume of neutron chamber to the neutron flux to be measured, a stronger signal can be obtained for any given flux level. Even of greater importance, a much lower flux level can be detected and measured with the present cup shaped electrode than with flat plate electrodes.

In addition, it was desired to secure an improved neutron sensitive coating for the electrodes. This was accomplished by first suspending the powdered metal, such as boron, in a carrier such as mineral oil. The mixture was then painted or sprayed on the graphite electrode portions to be coated and then the electrodes were baked in an inert atmosphere which gave a very rugged adherent coating. However, the coating must be largely freed of neutron activated elements introduced in the carrier and the colloidalizing process.

The thickness of boron or other selected metal is controlled by the number of coats applied. The baking can be done with an induction heater under a Bell jar with nitrogen or argon flowing through. The temperature is not critical but is preferably at about 500° C., while the time is that required to drive off all the oil, usually a minute or two. Using 20% boron, or other metal, suspension a normal coating produces a boron layer of about 1 mg./cm.$^2$. The optimum thickness is about 2 to 2.5 mg./cm.$^2$, assuming there is only one layer for a neutron to traverse. If more than one layer is available, then the layer should be thinner in order that the average neutron capture takes place near to the surface and thus has a better chance of producing a useful alpha particle.

The electrodes 7, 8 and 9 are supported in assembled relation by a retaining ring or adapter generally designated 12 which receives the sets of radially positioned quartz insulators 10 and 11. They pass through the mating openings in the various electrodes and are shielded from neutron attack by the graphite of the assembly, to prevent rays from such substances as Si$^{34}$ from entering the ionizing chamber and to minimize electrostatic fields at the insulator surfaces. In order to act as a supporting and retaining structure while still being insulated from the electrodes, and to space the retaining insulators away from the "hot" end of the chamber, the ring or adapter 12 is provided with a series of recessed openings 15 in its upper face. The centers of the openings are positioned about 120° apart radially and are adapted to receive the slotted legs 16 of the inner electrode 9 in spaced relation to the walls thereof. For retaining the inner electrode 9 in the ring or adapter 12 while permitting relative movement thereof for purposes of adjustment, as described more in detail hereinafter, the series of quartz insulators 10 are inserted through the radial openings 17 in ring 12, pass through the slots 18 in the legs 16 of electrode 9, and seat in aligned recesses 19 in the body of the ring, while their outer free ends project beyond the rim of ring or adapter 12 and seat in openings 20 of extensions 21 in outer electrode 7. They serve to effectively interlock the ring or adapter 12 and electrode 9 together. Since the legs 16 of the electrode 9 pass down through the recessed openings 15 in the ring or adapter 12 they may receive the ends of a key which bridges a pair of the legs and seats in openings 39, 39 therein. The intermediate portion of the key 46 passes through a bore in collar 47 integrally secured to the end of shaft or rod 45, and serves to interlock the electrode 9 and shaft 45 together.

For supporting the intermediate electrode 8, a series of brackets 22 project radially and extend upwardly from the body of the ring or adapter 12 and cooperate with vertical grooves or recesses 23 formed in the outer walls of the ring body. These brackets and latter grooves are spaced radially about the ring body at about 120° intervals, but are preferably displaced 60° from the recessed openings 15. Each bracket 22 has an opening 40 which is adapted to register with a mating recess 24 in the wall of the groove 23. The upstanding portions of brackets 22 and the recesses 23 serve to define sockets for the reception of lugs 25 projecting from the lower extremity of intermediate electrode 8. These lugs 25 also have openings 26 which co-act with openings 40 in brackets 22, and the recesses 24 to receive the quartz insulators 11 for interlocking the ring 12 and the intermediate electrode 8. The radial positioning of the insulators 11 serves to maintain the ring or adapter 12 and electrode 8 in spaced relation and to insulate them from each other. As heretofore indicated, the outer electrode 7 is adapted to fit over the intermediate electrode 8 and to define an ionizing chamber 13 therebetween. In this position the recesses 27 of this electrode receive the brackets 22 of the ring and the openings 20 in the extensions 21 register with openings 17 and recesses 19 of the ring, so that the quartz rods 10, when inserted therein, serve to interlock both electrodes 7 and 9 with the ring or adapter 12.

The retaining ring or adapter 12 is provided with a pair of spaced recesses in its lower face to receive sleeves 50, 50 which telescope into insulated sleeves 29, 29 seated in head 30. One of the sleeves 50 has a wall cut to receive a lead from the outer electrode 7, while the lead from the extension 55 projecting from the lower end of the intermediate electrode 8 passes down through the other sleeve 50.

The lead in tube 28 may be of any suitable material such as pure magnesium but is preferably a special magnesium alloy made by Dow Chemical Company and identified as Dow Metal 58135. The flange 31 is secured to the tube 28 adjacent one end, preferably by heliarc welding. Flanged cap 32, which is preferably of lead, fits over the components of the ion chamber with bolts 34 passing through registering openings in its flange and those of flange 31 as shown in Figs. 6 and 9. Bolts 34 serve to retain the cap 32 in position while the cap serves in turn to prevent accidental removal of the sets of quartz insulators 10 and 11. It also serves to retain the adapter or ring 12 in position and prevents disengagement of the telescoped sleeves 29, 29 and 50, 50.

The lead in wires for the electrodes 7, 8 and 9, preferably one-sixteenth inch in diameter and of chemical lead, drawn through 4 mm. quartz tubing, may pass axially up through the shield or tube 28, or standard two foot lengths of quartz tubing may be bent and sealed together to form a one turn helix the length of the tube. The helix may be wrapped with one-thirty second inch chemical lead which can be burned on to form a shield. The shield around the lead in wire is connected to the retaining ring or adapter 12 and is insulated from ground. The central push rod 45 surrounded by the lead tube 28 is used to adjust the inner electrode 9, and also serves as a voltage lead to this electrode. The lead in wires and central control rod were suspended in lead-in tube 28 and the latter poured full of paraffin. This then supports the leads and acts as a radiation plug so that the chamber position can be changed while the pile is at full power. At the outer end a screw adjustment 35 for the push rod 45, Amphenol connectors (not shown) for the leads, and a means (not shown) for circulating gas through the chamber are provided. The screw adjustment includes a threaded shank portion 38 having an enlarged disk shaped end 51 adapted to be received and swivel in a socket 52 mounted on the outer face of guide block 42 by welding or otherwise. The outer ends of block 42 are grooved to receive spaced guide rods 44, 44 projecting rearwardly from tube 28. The guide block 42 carries a socket 54 on its inner face for reception of one end of rod 45 so that registering openings in socket 54 and rod 45 permit interlocking the elements together through key 53. Clockwise rotation of the handle 35 on shank 38 advances the shank and in turn the push rod 45 to move the electrode 9 up into intermediate electrode 8. Of course, rotation of the handle 35 in the opposite direction serves to reverse the procedure.

In its operation, the chamber is subjected to neutron flux with the electrodes 7, 8 and 9 connected to the customary differential measuring circuit, indicated schematically in Fig. 7. Sources of potential 36 and 37 are provided for the inner and outer electrodes 7 and 9, respectively, while the intermediate electrode 8 is connected through the current meter, vacuum tube voltmeter, or galvanometer, as the case may be, to ground. Ionization from gamma or beta rays in chambers 13 or 14 produces potentials on the electrodes 7 and 9 which cancel out while the neutron flux acting only on the sensitive chamber 13, with the boron or other metal coated electrodes, produces a current in the circuit of the meter G which may be indicated by that meter, and serves as a measure of the neutron flux. However, where the ionization in chambers 13 and 14, due to beta or gamma radiation is unequal, adjustment of the electrode 9 toward and/or away from the intermediate electrode 8, changes the size of the sensitive volume of chamber 14 and therefore alters the compensation, to balance out currents of similar characteristics resulting from ionization in chamber 13. This adjustment is accomplished by raising or lowering the push rod 45, but the adjustment is limited by the size of slots 18 which co-act with insulators 10 passing therethrough, to determine the extent of adjustment.

In measuring the flux of the pile, the ionization chamber and tube are inserted in instrument holes in the pile (not shown). There is likely to be large flux gradients in these instrument holes. The optimum position for the chamber was found to be at the pile shield interface where the flux was about $6 \times 10^9$ neutrons cm.$^2$/sec. at 3800 kw. power, and the reaction length, that is, the distance in which the flux falls by a factor $e$, was about three inches. Since in the high flux pile it is expected that this value of flux density will be found near the reflector shield interface, it is probable that a similar flux gradient would exist there.

When the flux falls off exponentially it is clear that little can be gained by increasing the length of the chamber over about one relaxation length or, in this case, three inches. It is also clear that insulators and supporting structures should be placed as far back from the sensitive part of the chamber as possible in order to minimize the radiation incident on them. The front end of the chamber should have a maximum of sensitive area with a minimum of supporting structure.

Having thus described my invention, I claim:

1. A compensated ion chamber comprising an inner, an outer and an intermediate electrode defining adjacent ionization chambers, said inner and said intermediate electrode being disposed within said outer electrode, means for adjusting the position of one electrode for changing the volume of one of said chambers, and a neutron sensitive coating on the walls of one of said chambers.

2. A compensated ion chamber comprising an inner, an outer and an intermediate electrode defining a pair of adjacent ionization chambers, means for moving said inner electrode towards and away from the intermediate electrode to alter the sensitive volume of one of the ionization chambers and change its response to gamma radiation, and a neutron sensitive coating on the walls of the other of said ionization chambers.

3. A compensated ion chamber comprising a cup shaped outer electrode, an intermediate and an inner electrode disposed within said outer electrode to define a pair of adjacent ionization chambers, means for moving the inner electrode towards and away from the intermediate electrode to alter the volume of one of the chambers and change its response to gamma radiation, and a neutron sensitive coating on the walls of the other of said chambers.

4. A compensated ion chamber comprising a cup shaped outer electrode, a cup shaped intermediate electrode disposed within the outer electrode to define a first ionization chamber, an inner electrode disposed within the intermediate electrode to define a second ionization chamber, means for adjusting the relative positions of said intermediate and said inner electrodes to change the sensitive volume of said second chamber, and a neutron sensitive coating on the walls of said first chamber.

5. A compensated ion chamber comprising a cup shaped outer electrode, a cup shaped intermediate electrode disposed within the outer electrode to define a first ionization chamber, an inner electrode disposed within the intermediate electrode to define a second ionization chamber, means for moving the inner electrode towards and away from the intermediate electrode to alter the sensitive volume of the second chamber, and a neutron sensitive coating on the walls of said first chamber.

6. A compensated ion chamber comprising an adapter, an outer cup shaped electrode secured to the adapter adjacent its mouth, an inner and an intermediate electrode disposed within the outer electrode to define a pair of adjacent ionization chambers, means for adjusting one of said electrodes to change the sensitive volume of one ionization chamber, and a neutron sensitive coating on the walls of the other of said ionization chambers.

7. A compensated ion chamber comprising an adapter, an outer cup shaped electrode secured to the adapter adjacent the mouth of said electrode, a second cup shaped electrode disposed within said first electrode to define an ionization chamber, an inner electrode disposed within said intermediate electrode to define a second ionization chamber, means for moving said inner electrode with respect to said intermediate electrode to alter the sensitive volume of said second ionization chamber, and a neutron sensitive coating on the walls of said first ionization chamber.

8. A compensated ion chamber comprising an adapter, a cup shaped outer electrode secured to the adapter near the mouth of the electrode, a cup shaped intermediate electrode disposed within the first electrode and secured to the adapter to define an ionization chamber, an inner electrode disposed within the intermediate electrode to define a second ionization chamber, means for moving said inner electrode with respect to said intermediate electrode to alter the sensitive volume of the second chamber, and a neutron sensitive coating on the walls of said first ionization chamber.

References Cited in the file of this patent

UNITED STATES PATENTS 2,440,167    Broxon et al. _____ Apr. 20, 1948